United States Patent [19]
Macovski

[11] 3,815,409
[45] June 11, 1974

[54] FOCUSED SONIC IMAGING SYSTEM
[76] Inventor: Albert Macovski, 4100 MacKay Dr., Palo Alto, Calif. 94301
[22] Filed: Feb. 15, 1973
[21] Appl. No.: 333,128

[52] U.S. Cl. .............................................. 73/67.9
[51] Int. Cl. ........................................... G01n 29/04
[58] Field of Search............ 73/67.7, 67.8 R, 67.8 S, 73/67.9

[56] References Cited
UNITED STATES PATENTS
2,921,465  1/1960  Cook ................................... 73/67.7
3,057,189  10/1962  Joy ...................................... 73/67.8
3,090,030  5/1963  Schuck ........................... 73/67.8 S X
3,310,977  3/1967  McGaughey ......................... 73/67.9
3,690,311  9/1972  Schorum et al. ............. 73/67.8 S X Primary Examiner—Richard C. Queisser
Assistant Examiner—John P. Beauchamp

[57] ABSTRACT

A chirped or frequency modulated sonic wave is passed through a dispersive lens whose focal length varies with frequency. Thus the different frequencies in the sonic wave focus at different depths in the object. The reflected energy is applied to a band pass filter so as to respond to the particular depth being received.

17 Claims, 6 Drawing Figures

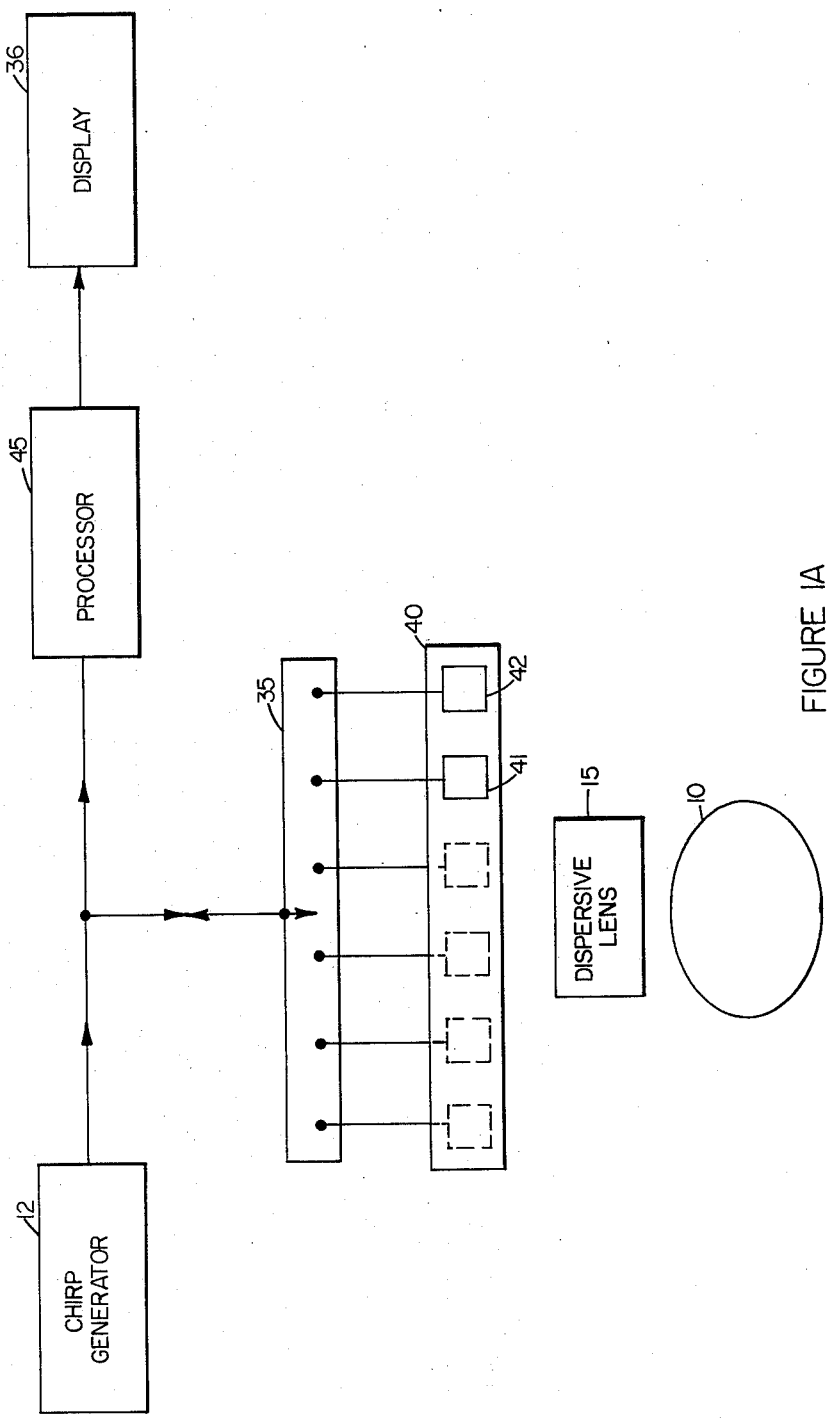
FIGURE IA

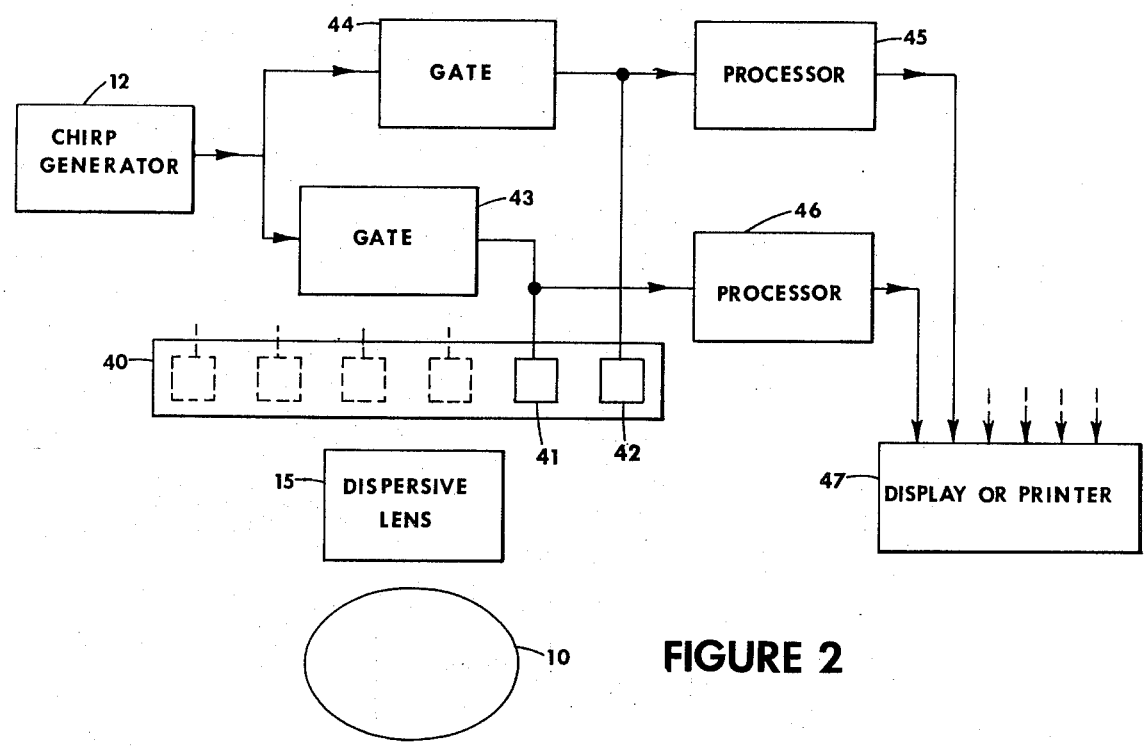
FIGURE 2
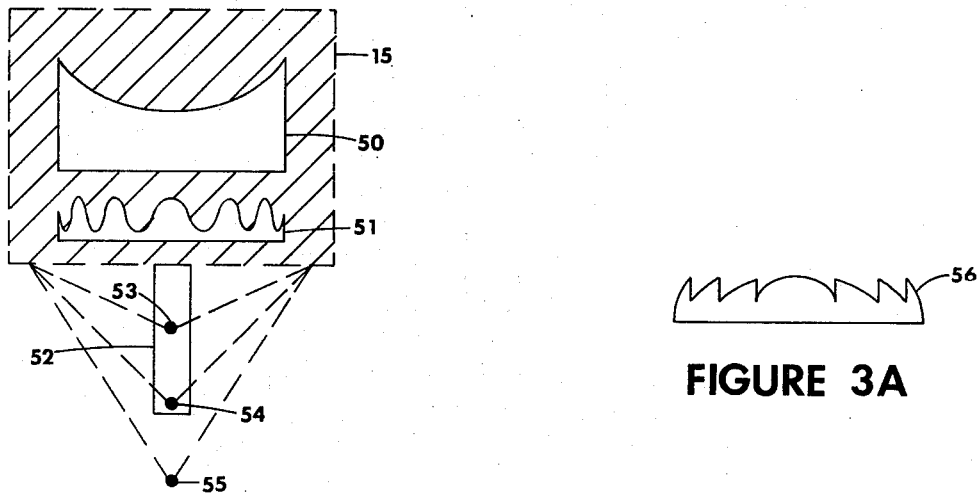
FIGURE 3
FIGURE 3A

3,815,409

FOCUSED SONIC IMAGING SYSTEM

BACKGROUND OF THE INVENTION

1. Field of the Invention

This invention relates to sonic imaging systems. In a primary application the invention relates to pulse echo systems where information is derived from the reflected sonic energy at different depths.

2. Description of Prior Art

Ultrasonic imaging techniques are widely used for non-destructive testing in industry and for imaging of soft tissue structures in medical diagnosis. Examples of commercially available instruments used in medical diagnosis include the Sonolayergraph made by Toshiba, Ltd. and the Sonograf made by the Unirad Corporation. These instruments use a pulsed sound source and record the received echoes coming from different depths. In the A mode presentation these are displayed as a deflection signal indicating the amplitude of the reflection. This technique is primarily used for echoencephalograms to study midline shifts in the brain. The most common technique is the B mode where the received echoes intensity modulate the display as the transducer is moved along to form a cross sectional image. Other modes are used which are essentially combinations and variations of these A and B modes. One example of the clinical use of A and B scan instruments can be found in the British Journal of Radiology, Vol. 44, Nov. 1971. "The use of ultrasound in the diagnoses of renal disease," by R. A. Mountfort et al.

The principal performance difficulties with the instruments stem from the use of a non-focused sonic beam. The propagating sonic beam is relatively broad, thus causing poor lateral resolution. If attempts are made to make the beam narrow, it will spread due to diffraction at an angle of approximately $\lambda/D$ where $\lambda$ is the wavelength of the sonic source and D is the diameter of the emerging beam. Existing beam widths are a compromise between the size of the initial beam and the diffraction spread. If a lens is used to focus the beam, it will be effective in only a narrow depth region, with the remainder of the beam being out of focus and exhibiting the poor lateral resolution.

Most interfaces in the body are relatively specular to sonic sources. Thus, when a collimated beam is used, the reflected signal is often missed since it bounces off at an angle which misses the transducer. Operators of B scan equipment are often instructed to use a "compound" scan which includes changing the angle of the transducer in addition to translating it. This helps to insure that tissue interfaces at many angles will be detected. When the data is received in this fashion, however, it is difficult to display in its proper intensity since some regions are scanned more often than others. As a result, in addition to requiring the compound scan, on-off presentations are used rather than the more meaningful grey-scale presentations. Operators become skilled in "painting" the images on a storage display by changing the angle to "fill in" areas which initially exhibited no relfections. Thus the operation becomes somewhat of an art and the resulting diagnosis becomes limited by artefacts.

SUMMARY OF THE INVENTION

An object of this invention is to provide ultrasonic imaging apparatus which will result in focused images over the entire cross-sectional region being studied.

It is also an object of this invention to provide a method of recording the correct amplitude of the ultrasonic reflections from interfaces of different angles so that a meaningful grey-scale image can be constructed.

Briefly, in accordance with the invention a chirped or frequency modulated signal is applied to a transducer. The resultant sonic wave is propagated through a dispersive sonic lens whose focal length is a function of frequency. Different frequencies of this wave thus focus at different depths. A band-pass filter is used on the received signal to obtain the reflections from the focused regions at different depths.

BRIEF DESCRIPTION OF THE DRAWINGS

For a more complete disclosure of the invention, reference may be made to the following detailed description of several illustrative embodiments thereof which is given in conjunction with the accompanying drawings, of which:

FIG. 1A illustrates an embodiment using a multiple switch and a transducer array;

FIG. 2 illustrates an embodiment using a transducer array;

FIG. 3 illustrates an embodiment of a dispersive lens;

FIG. 3A illustrates a Fresnel lens which forms a portion of a dispersive lens.

DESCRIPTION OF THE PREFERRED EMBODIMENT

Figure 1:
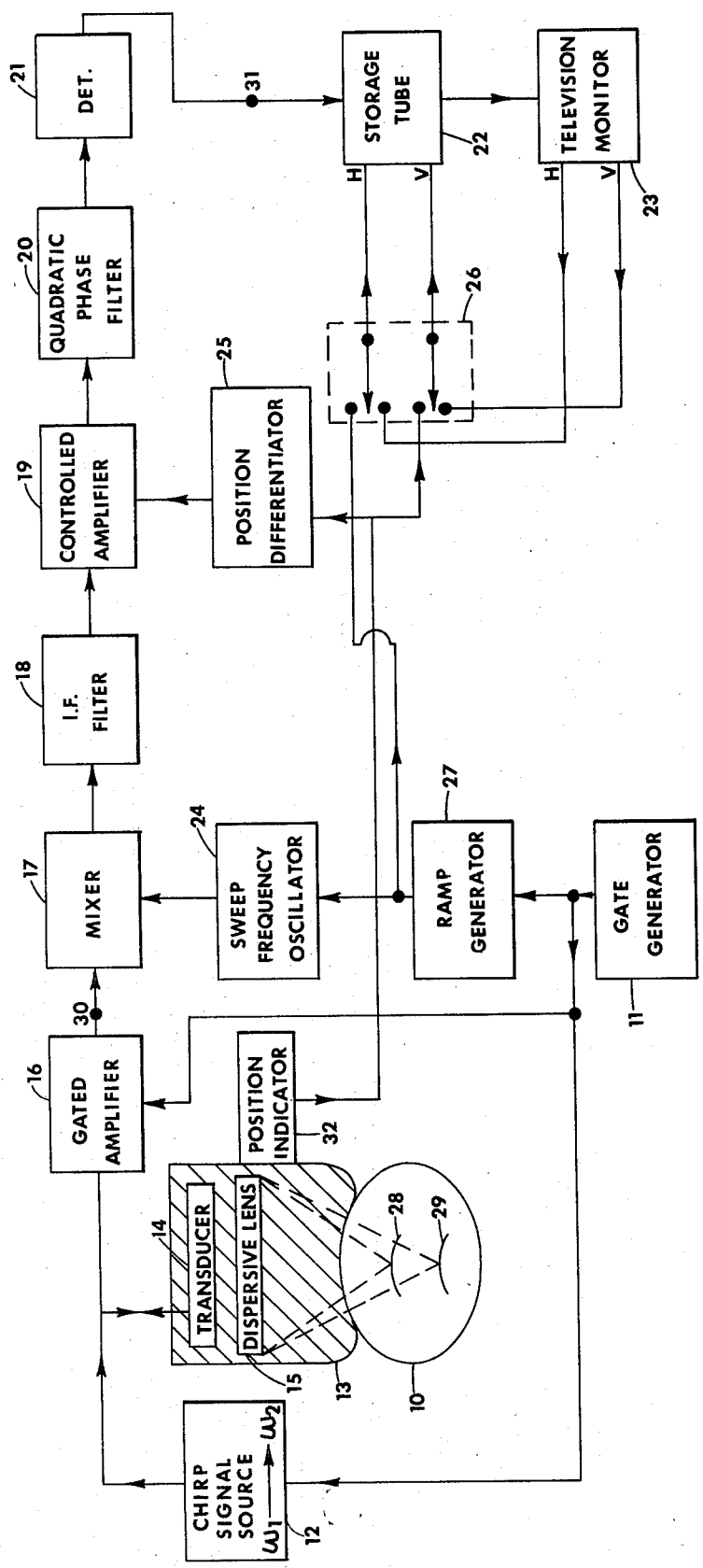
FIG. 1 is a block diagram illustrating an embodiment of the invention using a sweep frequency oscillator.

An understanding of the broad aspects of the invention may best be had by reference to FIG. 1 of the drawings. An object 10, for example, the human abdomen, is being studied by sonic reflections. A frequency modulated or "chirp" signal source gated on by gate generator 11 is applied to transducer 14. The freqeuncy is varied in time from $\omega_1$ to $\omega_2$. The resultant sonic wave is transmitted through dispersive lens 15. For convenience, the transducer 14 and lens 15 can be enclosed in fluid-filled container 13. The bottom of container 13 can be a pliable material such as plastic to facilitate good contact with the skin. Because of the dispersive nature of the lens 15, different frequencies of the sonic wave come to focus at different depths. For example one frequency region of the chirped wave will reach its focus at interface 28 within the body while another frequency region of the chirped wave will reach its focus at interface 29. This insures good lateral resolution at all depths. In addition, since the focused beam approaches each interface at a relatively broad range of angles, most of the reflected energy will be returned to the lens and transducer. The reflected sonic energy is received by lens 15 and transmitted to transducer 14 after a propagation time which indicates the depth. This signal is amplified by gated amplifier 16. It is preferable to use the signal from gate generator 11 to turn off this amplifier to avoid its being saturated during the time the transducer is being excited. The output signal 30 contains a sequence of signals whose arrival time indicates their respective depths. In addition, a specific frequency region of each received signal corresponds to the depth region which is in focus. One method of processing this signal, so as to receive only the focused information, is to apply it to a bank of filters of relatively narrow bandwidth going from $\omega_1$ to $\omega_2$. The number of filters used would depend on the resolution requirements. The outputs of each filter would be detected to indicate the amplitude of a focused reflection at a particular depth. The processed output signal would be formed by sequentially switching through the individual detector outputs in synchronism with the propagation of the sonic wave, thus responding solely to the focused reflections.

A preferred processing system is the heterodyne method illustrated in FIG. 1. The received signal 30 is applied to mixer 17. A sweep frequency oscillator 24 is also applied to mixer 17 to heterodyne the desired frequency range of the received signal to that of the intermediate frequency filter 18. For example, assume that at time $t_a$ a signal is received which reflected off a given boundary and that the frequency $\omega_a$ caused the dispersive lens to be in focus at that boundary. If the center frequency of the intermediate frequency filter is $\omega_{if}$, the sweep frequency oscillator is at $\omega_a \pm \omega_{if}$ at time $t_a$ to insure that the appropriate part of the received chirp signal is passed. As in any heterodyne arrangement, the oscillator frequency can be above or below the signal frequency since the mixer output frequency is determined by the difference. Similarly if a reflection at a different depth is received at $t_b$, and the dispersive lens at that depth focuses at $\omega_b$, the sweep frequency oscillator 24 is at $\omega_b \pm \omega_{if}$ at time $t_b$. The frequency of the sweep frequency oscillator can be voltage controlled and swept through its range by ramp generator 27. The ramp signal is started by the trailing edge of the gate signal from the gate generator 11, which is the time that echoes will begin to be received. For ultrasonic imaging of soft tissue regions, such as the abdomen, a chirped frequency range of about 3 to 6 MHz is a good choice as a compromise between resolution and attenuation. The maximum depth of interest in diagnosis is about 25 cm. The round trip propagation time of sonic energy through tissue of this depth is about 300 usec. The duration of the chirped signal is a relatively small percentage of this time, with about 20 to 100 usec being reasonable. Too short a chirp interval makes detection difficult since there are an insufficient number of cycles in each frequency range or too low a time-bandwidth product. Too long a chirp interval adds significantly to the time of each line scan and also requires that the transducer be relatively far from the surface to insure that the entire chirped pulse has been generated before reflections are received. If an i.f. frequency of 1.0 MHz is used, the swept frequency oscillator is slowly swept between 4 and 7 MHz during the 300 usec that signals are received. Since sonic attenuation increases with frequency it would be preferable if the dispersive lens were focused on the near surface at the high frequency and at the far surface at the low frequency. If such a lens is used, in the example just given, the chirped signal would first be modulated from 6 to 3 MHz for about 50 usec, and then in the next 300 usec, when reflections are received, the swept frequency oscillator would be swept from 7 to 4 MHz. In each case the high frequency region occurs first. This also provides best resolution in the region closest to the transducer.

The i.f. filter and all succeeding filters determine the response of the system and thus the depth resolution. The signal emerging from the i.f. filter is a chirped signal whose frequency is swept over the bandwidth of the i.f. filter and is thus a portion of the generated chirped signal. For example, if the i.f. filter has a 1 MHz bandwidth, its output will be a frequency modulated chirped signal going from .5 MHz to 1.5 MHz. The detection of this type of signal into a single pulse is well established in the radar field. The theory is well described in "Principles of High Resolution Radar" by A. W. Rihaczek, McGraw Hill. Chapter 6 on Pulse Compression Waveforms and Chapter 7 on Linear FM waveforms fully describe the theory involved. In general, if a chirped signal of linearly decreasing frequency is used, a filter network is required which will delay the higher frequencies more than the lower frequencies such that the resultant envelope will approach a narrow pulse, with all frequency components emerging at approximately the same time. This filter is called a linear time delay filter or a quadratic phase filter since, if the delay varies linearly with frequency, the phase is varying quadratically with frequency since the instantaneous frequency is the derivative of the phase. The time delay of a network is the derivative of the phase versus frequency characteristic.

Thus the output of i.f. filter 18 is amplified by controlled amplifier 19 and applied to quadratic phase filter 20. A number of suitable examples of quadratic phase filters or linear time delay compression filters as they are also called are described in Chapters 12, 13 and 14 of "Radar Signals, An Introduction to Theory and Application," by Charles E. Cook and Marvin Bernfield. One example given is an all-pass time delay network consisting of a lattice or a bridged-T. Another example is a dispersive ultrasonic delay line whose delay varies approximately linearly with frequency. Other examples include tapped delay lines and folded type meander lines. In any case the output becomes a relatively narrow pulse whose width is approxmately the reciprocal of the bandwidth. Thus a 1.0 MHz i.f. bandwidth chirped signal when properly filtered will form a pulse whose envelope is about 1 usec wide. This envelope is detected by envelope detector 21 to form the pulse output. A 1.0 usec pulse width corresponds to a depth resolution of about 0.75 mm. The significant improvement, however, is that this received signal corresponds to a focused part of the beam, thus providing excellent lateral resolutions which is limited only by the characteristics of the lens.

The detected signal 31 can be used to deflect an oscilliscope in an A scope presentation to provide a high resolution A mode system. Alternatively the signal 31 can be used to intensity modulate a cathode ray tube in the B mode presentation. As the transducer lens container 13 is moved along the body 10 a position indicator 32 coupled to the deflection electrodes causes the successive scans generated by ramp generator 27 to be deflected so as to form the two-dimensional cross-sectional image. This image, on the face of the cathode ray tube, can be photographed. Alternatively a storage type cathode ray tube can be used. These tubes, however, have very poor grey-scale rendition. A preferred embodiment uses an electrical storage tube 22 such as a silicon diode storage tube. One commercial version of this tube is called the Lithicon and is manufactured by Princeton Electron Products. Switch 26 switches the horizontal and vertical deflection inputs of the storage tube into the write and read modes. In the write mode, the switch 21 in the upward position, the ramp generator 27 provides the horizontal deflection for each line while the position indicator 32 provides the vertical deflection signal. The storage tube electrodes are also switched into the write mode so that signal 31 creates a stored electrostatic image. Whenever a readout is desired switch 26 is turned down into the read position and the storage tube electrodes are switched so that the stored video signal is read out into a conventional television monitor. The horizontal and vertical deflection signals can be supplied by the monitor as shown. Thus the information can be read in at arbitrarily slow rates and read out at television rates. To insure that changes in the velocity of the transducer-lens assembly 13 do not cause corresponding brightness changes due to the changes in the number of scan lines per unit distance, a position derivative is taken by position differentiator 25 to determine the velocity. The differentiator output is used to control the controlled amplifier 19 in a manner such as to reduce the gain when the velocity is reduced such as to maintain a constant brightness in the final display.

In addition to a linear motion of the container 13, a rotational motion can be used to create a range versus angle type display as are used in radar systems with sector plan-position-indicators. Here the position indicator 32 would become an angle indicator, and the storage tube 22 would be scanned in the same fashion during the write mode. In the read mode, the storage tube would continue to be read out in the conventional television raster fashion using the television monitor.

Either the translation or rotation of the transducer-lens assembly 13 can be accomplished mechanically with a motor drive, thus insuring uniform motion. It is probable that the rotation can be accomplished more rapidly than a linear scan and thus form a real time display. In this case a cathode ray tube would be used in lieu of the storage tube 22 and be directly viewed.

All transducer motion can be avoided by the use of an array as shown in FIG. 1A. An array of transducers 40 are used in conjunction with dispersive lens 15. A multiple switching system, 35 can be used to sequentially apply the chirped signal generator 12 and signal processing system 45 to each of the transducers of array 40. For example, when switch 35 is connected to transducer element 41, the chirp signal is applied from 12 and, by virtue of dispersive lens 15, the waves emitted from element 41 are sequentially focused at different planes in object 10. The resultant reflections are received by element 41 and processed as previously described in processor 45 which contains the appropriate mixer, i.f. filter, quadratic phase filter and detector to provide the correct output signal for the line illuminated by element 41. The resultant line information is appropriately displayed in display 36. This process is then repeated by switching switch 35 to element 42 and then to the other elements of array 40 so as to provide the various line information which makes up the desired plane. Thus, instead of a single moving transducer 14, the entire processing system of FIG. 1 is sequentially switched amongst the individual transducers of array 40. Of course, with a static array, the position indicator 32, position differentiator 25 and controlled amplifier 19 are not required. In the embodiment shown in FIG. 2 the frame time of the resultant image is decreased by processing each transducer output simultaneously. The chirped signal generator is applied to all transducers using an appropriate gate. For clarity gates 43 and 44 are shown connected to transducers 41 and 42. The received chirped signals are processed identical to signal 30 in FIG. 1. Thus processors 45 and 46 contain the appropriate mixer, i.f. filter, quadratic phase filter and detector to provide output signals from each transducer identical to that of signal 31 in FIG. 1. Each of the processor outputs contain the information from one line in the object 10. Thus each processor output can modulate one line of a multihead printer to form the composite image. Alternatively the input to a cathode ray tube can be rapidly switched from one processor output to another while the beam is being appropriately deflected to form a real time display of a body cross section.

The dispersive lens in either FIG. 1 or FIG. 2 can be constructed in a number of ways. The basic requirement is that the focal length vary with frequency, and preferably, increase with decreasing frequency since the attenuation of sound increases with frequency. Thus regions at greater depths will experience less attenuation if a lower frequency is used at the longer focal lengths. The focal length of a simple lens can be given by $$f = \pm R/n_1 - n_2$$

where R is the radius of curvature, $n_1$ is the index of refraction of the lens material and $n_2$ is the index of refraction outside of the material. The plus sign is used for convex surfaces and the negative sign for concave surfaces, assuming a plano-convex or plano-concave lens as is illustrated by lens 50 in FIG. 3. If the refractive index of either material varies with frequency, the focal length will similarly vary with frequency. Unfortunately most materials are relatively non-dispersive at sonic frequencies. One liquid with a reasonable amount of dispersion is diphenyl pentachloride, $CL_2CL_6H_3C_6H_2Cl_3$ whose veloicty of propagation increases about 10 percent between 1–20 MHz. Its properties are described on p. 479 of "Absorption and Dispersion of Ultrasonic Waves" by Karl F. Herzfeld and Theodore A. Litovitz, Academic Press (1959). This material has its index close to that of water. If it is used with water to form a lens structure the focal length will vary considerably with frequency because of the profound change in $n_1 - n_2$.

Another method of providing a dispersive lens is the combination of a refractive lens and a Fresnel lens as illustrated in FIG. 3. Composite lens 15 includes refractive lens 50 which is a positive lens since the refractive index of material is less than that of the surrounding water. The amplitude transmission of this lens structure is a quadratic phase function and is given by $$t_1(r^2) = \exp - j(k/2f)r^2$$

where $r$ is the radius, $k$ is the wavenumber of $2\pi\lambda$ where $\lambda$ is the wavelength of the sonic signal, and $f$ is the focal length of the lens as previously defined. This characteristic of a lens is fully described in Chapter 5 of "Introduction to Fourier Optics" by Joseph W. Goodman, McGraw-Hill, 1968. If the refractive lens is made of non-dispersive materials, as is normally the case with ultrasonics, the focal length $f$ of this lens will be independent of frequency. The Fresnal lens is a structure whose radial spatial frequency linearly increases with radius. Its transmission function, whether amplitude or phase, can be expressed by the general relationship $$t_2(r^2) = \sum_{n=-\infty}^{\infty} b_n \exp. jnar^2$$

This is a sum of functions which are periodic in $ar^2$ where the $n^{th}$ harmonic has an amplitude $b_n$ and where $a$ represents the rate of spatial frequency increase. The total amplitude transmission of the combined system is given by $$t_3(r^2) = \sum_{n=-\infty}^{\infty} b_n \exp. jr^2 (na - k/2f)$$

This expression represents an infinite sum of lenses whose individual focal lengths $f_n$ are given by $$f_n = f/1 - 2fnac/\omega$$

where $c$ is the velocity of sound and $\omega$ is the sonic frequency. For positive values of $n$, such as $n = 1$, this expression has the desired increase in focal length with decreasing frequency.

One Fresnel zone plate which can be used is made of rings of attenuating material such as air which alternately transmit and stop the sound in the successive rings. Its transmission function is given by $$t_2(r^2) = \tfrac{1}{2}[1 + \cos ar^2]$$

Expressing this in the general formula, $$b_{-1} = \tfrac{1}{4}, \; b_o = \tfrac{1}{2}, \text{ and } b_1 = \tfrac{1}{4}$$

This lens function has two undesirable responses due to $b_{-1}$ and $b_o$, and the desirable $b_1$ corresponding to $n = 1$. When combined with the refractive lens, as shown in FIG. 3, this lens contains three focal lengths, the original due to $n = 0$ as shown at 54, a shortened one due to $n = -1$ at 53 and the desired one due to $n = 1$ at 55. A small cylinder of sonic absorbing material 52, such as rubber, can be used to absorb the energy from the two undesired focal points so that they will not propagate further. Only the desired focal spot whose focal length varies inversely with frequency will remain. This method, however, is somewhat inefficient of sonic energy. More efficient structures can be made using phase-shifting rings. One such example is a Fresnel lens made up of parabolic sections of material having a refractive index different than its surround as shown in FIG. 3a. This phase structure 56, as the previous one, is periodic in $ar^2$ and can be analyzed using a Fourier series. In general each component $b_n$ of the series is given by $$b_n = \frac{1}{2\pi} \int_{-\pi}^{\pi} t_3(ar^2) \exp -jnar^2 \, d(ar^2)$$

where the transmission function $t_3$ in the region from $-\pi$ to $\pi$ is given by $t_3 = \exp j(n_1 - n_2)kar^2$ where $n_1$ is the refractive index of the Fresnel lens material, $n_2$ is the refractive index of the surround and $k$ is the wavenumber $2\pi\lambda$. Letting $(n_1 - n_2)k = A$ and integrating we obtain $$b_n = \sin(A - n)\pi/(A - n)\pi = \text{sinc}(A - n)$$

Thus, if the Fresnel lens is designed so that $A = 1$, this lens will only have a component at the desired $n = 1$ with all other values of $n$ being zero. Thus, when the lens of FIG. 3a is used with a conventional refractive lens as in FIG. 3, it will provide a single focus at position 55. Unfortunately, it will have this single component only at one sonic frequency, since $A$ is proportional to frequency. The desired results can still be obtained, however, by designing the Fresnel lens such that $A = 1$ at the center frequency. At the lower and higher frequency ranges some other components at other values of $n$ will appear. For example, assume a 50 percent frequency variation so that $A$ goes from .8 to 1.2. At the extremes in low and high frequency, the largest undesired components reach, at most, an amplitude of 25 percent of the desired $n = 1$ mode. This corresponds to a power of about 7 percent of the desired mode which should be negligible.

Another approach is to design the Fresnel lens such that $A = 1$ at the highest frequency and thus the shortest focal length, and goes down to about .65 at the lowest frequency. Thus in the high frequency region only the desired mode will exist. In the low frequency region other undesired modes will come into existence. Those with $n < 1$ will have shorter focal lengths and can be absorbed as shown in FIG. 3. Those with $n > 1$ will have longer focal lengths than the desired mode. However, the system is designed such that the lowest frequency corresponds to the deepest desired penetration. Thus these modes will reach their focus outside of the body area. They can be suppressed by placing absorbent material underneath the region being investigated.

Figure 4:
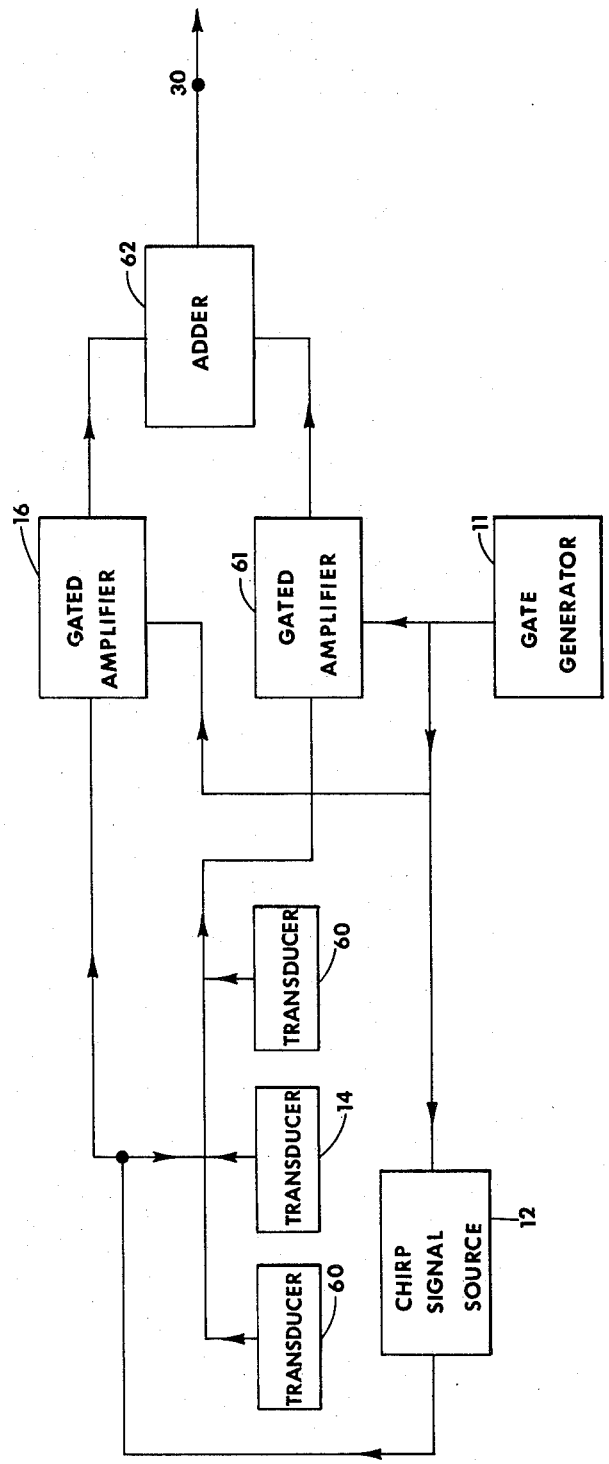
FIG. 4 illustrates a method of using additional receiver transducers.

Various reflections and refractions of the object being observed may cause the reflected waves to focus at a position which misses or partially misses the transducer 14 in FIG. 1. The configuration of FIG. 4 can be used where additional receiving transducers 60 are placed adjacent to the transmit-receive transducer 14. These additional transducers can be in the form of a ring around the transducer 14 so that 60, shown in FIG. 4, would represent the cross section of the ring. The output of these receiving transducers are applied to an additional gated amplifier 61 which, like gated amplifier 16, is turned off during the interval of the chirp signal source by gate generator 11. The outputs of gated amplifiers 16 and 61, which represent the total received signals, are added by adder 62 to form received signal 30. This signal is then processed exactly as in FIG. 1, but is less susceptible to amplitude losses due to displacement of the focal region of the reflected waves.

In all of the examples shown, the Fresnel lens was combined with a refractive lens. An alternative arrangement is a combination of a Fresnel lens and a reflective lens. The analysis and operation are identical to that of the refractive lens combination.

What is claimed is:

1. Apparatus for imaging ultrasonic reflections from an object comprising:
    a transducer for generating ultrasonic energy;
    a chirped signal source connected to the transducer to generate a chirped ultrasonic wave;

a dispersive lens positioned in the path of the ultrasonic wave between the transducer and the object whose focal length varies with the frequency of the ultrasonic energy;

means for receiving the chirped ultrasonic wave when it is reflected off the object to form a received chirped signal;

means for processing the received chirped signal so that the portion of the received chirped signal being detected represents information from the plane at which the dispersive lens is in focus; and means for displaying the processed signal.

2. Apparatus as recited in claim 1 wherein the means for receiving the chirped ultrasonic wave includes the transducer used for generating the chirped ultrasonic wave and means for gating the transducer output so that the chirped signal source will be suppressed.

3. Apparatus as recited in claim 2 wherein the means for receiving the chirped ultrasonic wave further includes at least one additional transducer whose output is combined with that of the transducer used for generating the chirped ultrasonic wave.

4. Apparatus as recited in claim 1 wherein the means for processing the received chirped signal comprises:
a mixer having on input terminal connected to the received chirped signal;
a swept frequency oscillator connected to the second input terminal of the mixer;
an intermediate frequency filter connected to the mixer output terminal;
a quadratic phase filter connecting to the output of the intermediate frequency filter for generating an output signal corresponding to the amplitude of the reflections; and
a detector for detecting the amplitude of the output signal.

5. Apparatus as recited in claim 4 wherein the instantaneous frequency of the swept frequency oscillator translates that portion of the spectrum of the received chirped signal into the passband of the intermediate frequency filter corresponding to the plane at which the dispersive lens is in focus.

6. Apparatus as recited in claim 1 wherein the dispersive lens is made of a material whose velocity of propagation varies with frequency.

7. Apparatus as recited in claim 1 wherein the dispersive lens includes a Fresnel zone plate structure containing concentric rings whose periodicity increases linearly with radius.

8. Apparatus as recited in claim 7 wherein the Fresnel zone plate structure contains alternate rings of material having varying degress of attenuation of the sound energy.

9. Apparatus as recited in claim 7 wherein the Fresnel zone plate structure contains alternate rings of material having varying phase shifts to the sound energy.

10. Apparatus as recited in claim 9 in which the alternate rings have a parabolic thickness change with radius.

11. Apparatus as recited in claim 7 wherein a refractive lens is placed adjacent to the Fresnel zone plate structure to form a combination lens.

12. Apparatus as recited in claim 11 in which the combination lens has a focal length which increases with decreasing frequency.

13. Apparatus as recited in claim 7 wherein an absorption pad is placed along the axis of the lens to absorb the undesired modes.

14. Apparatus as recited in claim 1 wherein the means for displaying the processed signal includes a video storage tube for storing the processed signal in an array of modulated raster lines as it is received and means for reading out the stored image at television rates.

15. Apparatus as recited in claim 14 including means for varying the amplitude of the processed signal applied to the video storage tube directly with the velocity at which the transducer is moved.

16. Apparatus for imaging ultrasonic reflections from an object comprising:
an array of transducers for generating and receiving ultrasonic energy;
a chirped signal source connected to each transducer in the array;
a dispersive lens positioned in the ultrasonic path between the array of transducers and the object whose focal length varies with the frequency of the ultrasonic energy;
means for receiving the reflected chirped ultrasonic waves at each transducer in the array to form a plurality of received chirped signals;
means for processing the plurality of received chirped signals so that the portion of each received chirped signal being detected at any time represents information from the plane at which the dispersive lens is in focus; and
means for displaying the plurality of processed signals.

17. Apparatus as recited in claim 16 including means for sequentially switching the chirped signal source amongst the array of transducers and wherein the means for processing the plurality of received chirped signals includes means for sequentially switching the input to a processor amongst the plurality of received chirped signals.

* * * * *